Dec. 28, 1943.  A. R. THOMPSON  2,337,784
APPARATUS FOR TREATING MILK
Original Filed April 18, 1940   3 Sheets-Sheet 1
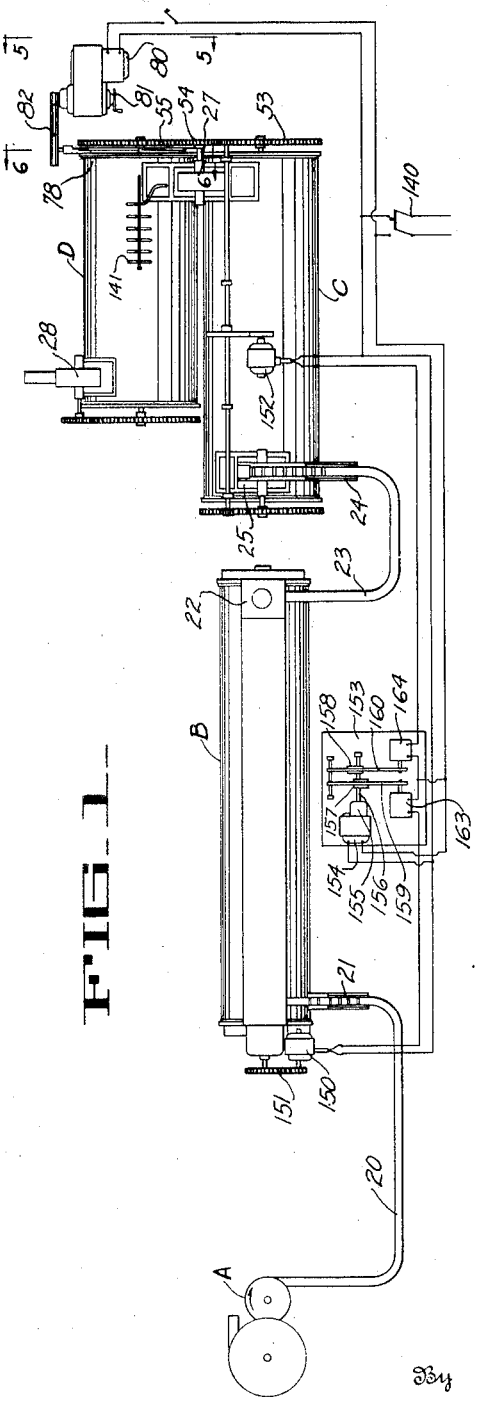
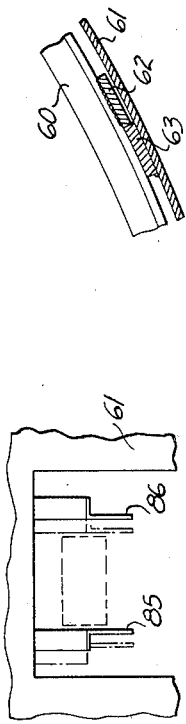
Inventor
ALBERT R. THOMPSON
By Philip A. Minnis
Attorney Dec. 28, 1943.   A. R. THOMPSON   2,337,784
APPARATUS FOR TREATING MILK
Original Filed April 18, 1940   3 Sheets-Sheet 2

Inventor
ALBERT R. THOMPSON
By Philip G. Minnis
Attorney

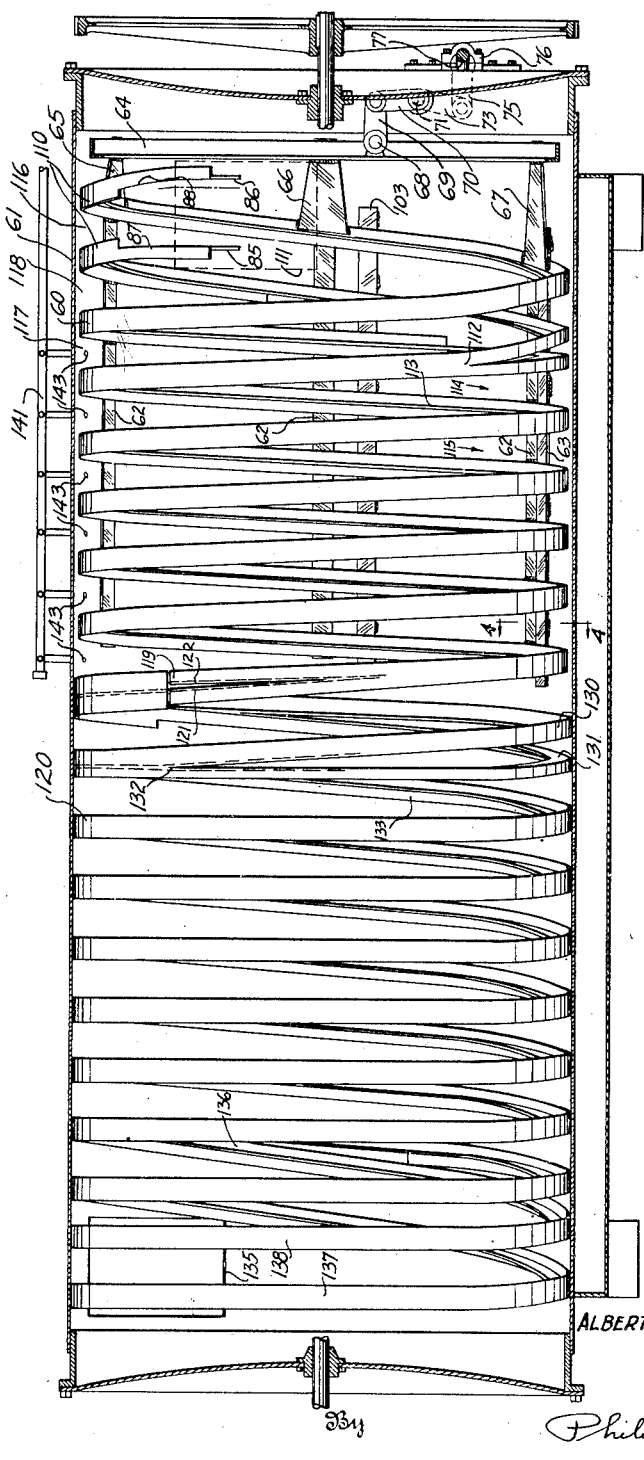

Patented Dec. 28, 1943

2,337,784

UNITED STATES PATENT OFFICE 2,337,784

APPARATUS FOR TREATING MILK

Albert R. Thompson, Los Gatos, Calif., assignor to Food Machinery Corporation, San Jose, Calif., a corporation of Delaware Original application April 18, 1940, Serial No. 330,294. Divided and this application May 21, 1941, Serial No. 394,471

19 Claims. (Cl. 259—54)

This invention relates to the canning art.

One of the objects of my invention is to provide apparatus for carrying out the improved method disclosed in my application, Serial No. 330,294, filed April 18, 1940, of which this application is a division.

Another object of the invention is to provide apparatus for imparting agitation to containers while the contents thereof are being processed.

A further object of the invention is to provide an improved apparatus for cooling canned evaporated milk after it has been sterilized and particularly to prevent the formation of skin on the milk while it is being cooled.

The formation of skin in canned milk is one of the major difficulties with which the operators of evaporated milk plants have to contend. Skin may be caused by certain factors in the processing of the milk and also by other factors, such as the fact that the tendency of milk to form skin varies with the seasons. As a result, the operators are obliged to be constantly on the look-out for its occurrence.

The standard practice in milk plants is to take sample cans at frequent intervals from every day's run to the laboratory for testing. The principal reason for this precaution is that the presence of skin makes the milk unsightly and unattractive to the consumer and impairs the quality of the milk. If there is skin present in the milk at the end of the process it cannot be eliminated by extra processing for it is then too late because the skin has become a permanent formation that cannot be changed.

In accordance with my invention, as soon as the sterilizing heat treatment has been concluded I start the cooling treatment and simultaneously subject the milk to agitation. The agitation heretofore usually employed in milk processing was obtained by turning or rotating the can on its axis. In my improved apparatus I prefer to use a different kind of agitation. I have found that a relatively vigorous form of agitation is necessary to prevent skin formation. Moving the can in alternating directions to utilize the inertia effect of the milk gives the desired result.

I continue to shake the can constantly until the cooling treatment has reduced the temperature of the milk well below 180° F., which I believe is the critical temperature at which skin tends to form. After the temperature has been safely reduced through this zone, the danger of skin formation is past and the milk can be further cooled in the usual manner, employing gentle rotary agitation to aid the heat extraction. The can should not be shaken any longer than is necessary to prevent skin formation because too much agitation will reduce the body of the milk.

While I shake the can primarily to prevent skin in the milk, this extra agitation has an additional beneficial effect. I have found that in cooling evaporated milk after it has been sterilized, the quicker the heat is extracted, the better. Merely cooling the milk in a more or less leisurely manner is not enough. Although the milk is sterile, it is nevertheless in a sensitive condition, and if not properly handled may develop undesirable characteristics during the cooling process. Rapid heat withdrawal preserves the high quality of the milk, insures a smooth, creamy product, maintains its stability, and retains its body. The added agitation from the skin-preventing shaking promotes heat exchange and thus increases the rate at which the milk temperature is lowered.

In the drawings:

Fig. 1 is a diagrammatic showing in plan view of the entire apparatus as it is usually laid out in an evaporated milk plant.

Fig. 2 is a fragmentary showing of a portion of the canway illustrated in Fig. 7, taken from the interior thereof.

Fig. 3 is a fragmentary showing of the feed end of the agitating canway, as it would appear from the exterior of the shell with the transfer valve removed.

Fig. 4 is a fragmentary sectional view taken as indicated by the arrows 4—4 in Fig. 7.

Fig. 7 is a sectional view of the cooler with the canway construction shown in elevation and the reel omitted for clarity.

Figure 5:
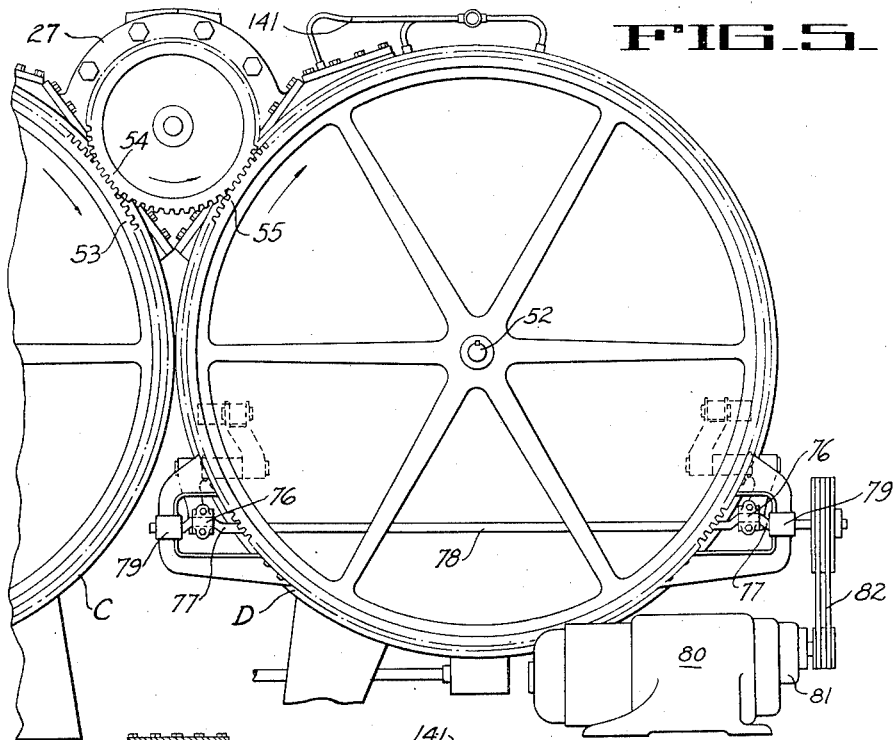
Fig. 5 is an end view of the cooler taken as indicated by the arrows 5—5 in Fig. 1.

Referring to Fig. 1, reference character A indicates a can filling and soldering machine, B a preheater, C a sterilizer, and D a cooler; the arrangement being such that the cans pass from one to the other in the order named.

The can filling and soldering machine A is of the continuous automatic type adapted to receive a continuous file or procession of cans, and to fill them with milk through small openings provided in the head of each can, and then to apply solder over the openings to hermetically seal the cans. Machines of this type are well known in the art and form no part of the present invention, so that further description is believed unnecessary.

The filled and sealed cans discharged from the machine A are received by an inclined gravity chute 20, which may function as an accumulator, as will be presently described.

The chute 20 delivers the cans to an elevator 21 which feeds the cans into the preheater B. The cans are automatically discharged from the preheater B through a discharge valve 22, which deposits the cans in a gravity transfer chute 23, which delivers the cans to an elevator 24 that deposits them in a steam tight rotary pocketed valve 25 which introduces the cans into the sterilizer C. The cans are automatically transferred from the sterilizer by the transfer valve 27, which introduces them into the cooler D, from which they are finally discharged through the valve 28.

Having disclosed generally the procedure of the cans through the apparatus, the construction thereof will now be explained.

The preheater B may be of the conventional reel and spiral type, and preferably is of the general construction illustrated and described in U. S. Letters Patent to A. R. Thompson No. 2,092,434. Heat may be supplied to the interior of the preheater, by means of a series of steam pipes, not shown, projecting different distances into the heating chamber from one end thereof, as disclosed in the above-identified patent. By this arrangement, a graduated temperature may be obtained in the preheater, ranging from approximately 100° F. at the inlet end, to approximately 210° F. prior to and up to the discharge end, so that as the cans are advanced through the machine, they are gradually heated up to the temperature of 210° F. and held at that temperature for a period of time to complete the stabilization before being discharged.

Figure 6:
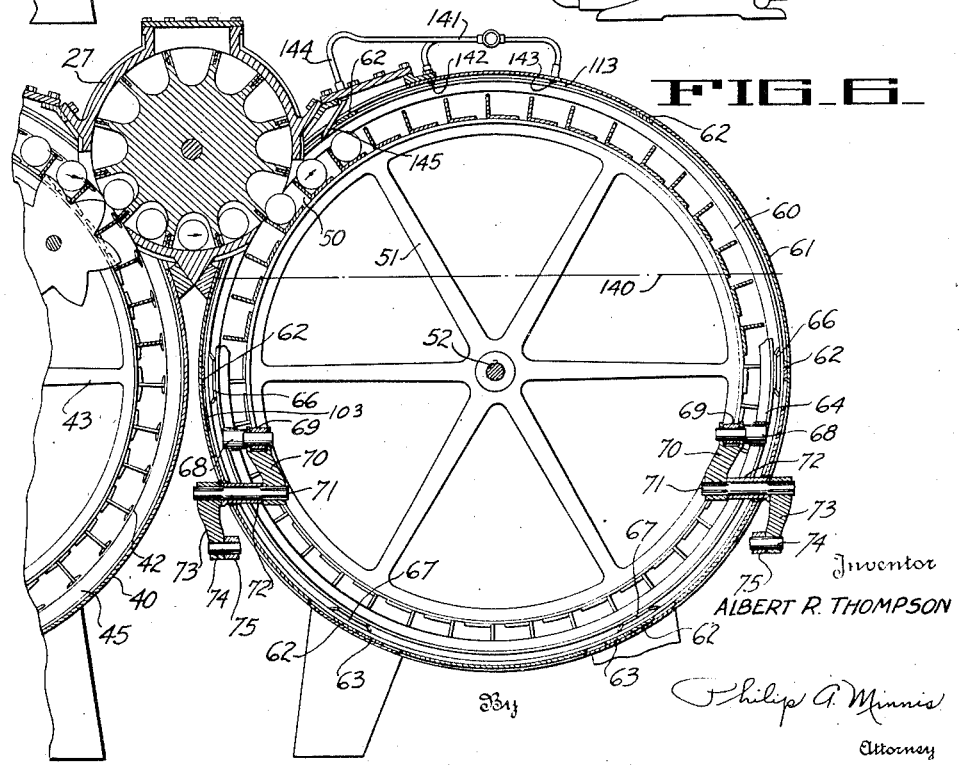
Fig. 6 is a section of the cooler taken as indicated by the arrows 6—6 in Fig. 1.

The sterilizer C, a portion of which appears in Figs. 5 and 6, comprises a cylindrical shell 40, closed at the ends by heads to form an enclosed chamber into which steam under pressure may be introduced for supplying the heat of sterilization. Any suitable means, not shown, may be provided for heating the interior of the sterilizer to maintain the proper sterilizing temperature, ordinarily from 240° F. to 245° F.

The cans, it will be recalled, are transferred from the preheater by the chute 23 (Fig. 1) and elevated by the elevator 24 to the valve 25, which introduces the cans one by one, into the channels between the longitudinal rails 42 (Fig. 6) of the reel 43. A spirally trending canway 45 is secured to the interior of the shell 40 to advance the cans along the can channels formed by the rails 42 from the inlet valve 25 to the transfer valve 27.

The transfer valve 27 may be of the construction illustrated in U. S. Letters Patent to A. R. Thompson, No. 1,467,960, which enables the cans to be automatically transferred from the sterilizer to the cooler without release of pressure on the cans. The cans are transferred as indicated by the arrows in Fig. 6, and are deposited in channels formed between longitudinally extending angle rails 50 carried by reel 51 mounted on shaft 52.

The sterilizer reel 43 and the cooler reel 51 are rotated in the same clockwise direction. The sterilizer reel shaft has a gear 53 (Fig. 5) meshing with gear 54 which operates the transfer valve 27. The gear 54 also meshes with the gear 55 for driving the cooler reel shaft 52 in synchronism.

A canway is provided in the cooler to advance the cans along the rails 50. A portion 60 of this canway is movable with respect to the shell 61 of the cooler D, and is mounted for reciprocation axially of the cylindrical shell in order to impart agitation to the cans when they enter the cooler, as will be more apparent later in the description.

The construction of the cooler canway is shown in Fig. 7. The movable portion 60 comprises several spiral turns of T rail which are secured together as a rigid unit by means of straps 62. The bottom straps 62 on each side of the center have sliding bearings on straps 63 (Figs. 4, 6, and 7) which are welded to the shell 61, so that the straps 63 consitute the sliding bearing supports for the agitating spiral unit 60. In addition, two spacer strips 103 are secured to the shell and contact the back of the canway to aid in guiding the unit 60 for reciprocation within the shell 61. The means for reciprocating this unit will now be described.

A ring 64 (Figs. 6 and 7) is rigidly connected to the unit 60 by means of plates 65, 66, 67. The ring 64 has two pins 68 mounted thereon which are connected by links 69, to levers 70 splined on shafts 71. The shafts 71 extend laterally outside the tank through bearings 72 mounted on the shell 61. The outer ends of the shafts 71 have levers 73 splined thereon. The depending ends of the levers 73 are connected by means of pivot pins 74 with links 75. The opposite ends of the links 75 are pivotally attached by means of bearings 76 (Figs. 5 and 7), with cranks 77 formed in the transversely extending shaft 78 which is supported for rotation in bearing brackets 79 mounted on the exterior of the shell. The shaft 78 is rotated by means of a motor 80, variable speed drive 81 and belt drive 82.

It will be apparent that by this means the crank shaft 78 is constantly rotated, causing oscillation of the levers 70, 73 and reciprocation of the ring 64, which in turn causes reciprocation of the movable portion 60 of the cooler canway. While I have referred to this as constant agitation, it will be noted that I have provided the variable drive 81 (Figs. 1 and 5) so that the speed can be varied somewhat. I also connect the motor 80 to the line through an individual switch so that the agitation can be used or not as conditions demand. Under most conditions, however, I find that the agitation is necessary and advantageous. When the motor is turned on and the speed set, the agitation continues constantly. I have obtained good results with a speed of reciprocation of the canway 60 of 85 to 125 strokes per minute. Excessive agitation, however, is to be guarded against, since it will tend to break down the body of the milk, and reduce its viscosity.

In order to facilitate introduction of the cans into the reciprocating canway 60, the inlet end of the canway is formed by means of two spiral guide rail sections 85, 86. In Fig. 3, the ends of the rail sections 85 and 86 move from the full line position to the dot-dash line position, and then back to the full line position, in each complete reciprocation. The inlet ends of the canway sections 85, 86 are spaced apart a distance substantially equal to the length of the can plus the length of the stroke of the movable canway portion 60. The can is introduced in the position shown in broken lines, and due to the spacing of the ends 85, 86, neither obstructs admission of the can at any time. The inner sides of the flanges of the canway portions 85, 86 are cut away at 87, 88 (Fig. 7) in order to admit the can into the canway.

While the spacing of the ends of the sections 85, 86 shown in Fig. 3 is necessary in order to admit cans during reciprocation of the canway, the spacing is reduced immediately thereafter so that the canway will take control of the cans and start shaking them as soon as they start to travel around the canway. As will presently appear, this is one of the reasons for employing two separate rail sections 85, 86 at the receiving end of the canway. They converge until at about the point 110 they are spaced apart a distance only slightly in excess of the can length so that the reciprocation of the canway 60 is imparted to the cans after they pass the point 110. From that point on the spacing of the two sections 85, 86 is maintained constant.

Another purpose in employing the two sections at the beginning of the canway is to use a different angle of lead than in the main body of the canway. It is desirable for reasons of construction to lead the can entirely away from the inlet opening 111 in the first turn. Thereafter the can may advance at a slower rate. And since this rate is constant the angle of lead of the canway remains constant and a single rail construction for the can track may be employed. In Fig. 7 the single rail constant lead begins at the point 112. From this point on, both faces of the rib of the T are employed. For example, the rib at 113 contacts the left end of the can, descending as indicated by arrow 114, and contacts the right end of the can descending as indicated by the arrow 115. The rapidity with which the can is led away from the inlet 111 is emphasized by the fact that while the can is in the space 116 between portions 85, 86 at the beginning of its first revolution, at the end of its first revolution it is in the space 117. The cans never enter the space 118.

The movable portion 60 of the canway ends at 118. At this point, the can is to be transferred to a stationary canway 120, which is rigidly mounted within the shell 61. In order to insure transfer of the can from the reciprocating canway 60 to the stationary canway 120, the end 119 of the reciprocating canway is forked to provide two guiding ribs 121, 122 (Fig. 2) which are alternately aligned with the rib 123 of the stationary canway 120 during the reciprocation of the canway 60 by reason of the fact that the ends of the ribs 121, 122 adjacent the rib 123 are spaced apart a distance equal to the stroke of the reciprocating canway 60.

In the first turn of the stationary canway the angle of lead is again changed to obtain sufficient clearance to permit the reciprocation of the last turn of the agitating canway. This necessitates the split or double rail comprising the angle sections 130 and 131. The rib of the section 130 guides the left end of the can in the transfer zone and the section 131 guides the right hand end after the can is completely in the stationary canway 120. The two sections 130, 131 converge at 132, and, since the lead remains constant, the single rail 133 of T-section may be employed until the can approaches the discharge outlet 135. At the point 136 the double rail construction is again employed to increase the lead and shift the can over into line with the discharge outlet 135, to which it is delivered by the two tracks 137, 138.

Water is employed as the cooling medium in the cooler D, but since the water level in the cooler is maintained at the point indicated by the line 140 (Fig. 6), additional means are provided in conjunction with the agitating canway 60 to apply cooling medium to the cans in the upper portion of the spiral. The reason for supplying this additional cooling medium is to obtain a rapid rate of heat withdrawal in the first stage of the cooling treatment and to insure constant application of cooling medium even when the cans are elevated above the water level 140.

Accordingly, I provide a system of pipes indicated generally at 141, which supply cooling water to spray nozzles 142, 143, which distribute the water over the tops of the cans located on the upper side of the reel 51. It will be noted in Fig. 7 that there are a series of these nozzles, such as 143, located between the turns of the agitating spiral 60. A separate pipe line 144 (Fig. 6) has an outlet 145 for supplying cooling medium to the cans as they issue from the transfer valve 27.

The continuous type apparatus, such as that disclosed in Patent No. 1,499,038 to A. R. Thompson, dated June 24, 1924, operates constantly in that the reels of the three units are constantly rotating. The apparatus disclosed in Fig. 1 of the drawings of this application may be operated in this manner if desired. The preheater B has a motor 150 which drives the preheater reel through suitable gearing 151. Similarly, the motor 152 drives the reel of the sterilizer C, and, through the gears 53, 54, 55, the reel of the cooler D. By operating the motors 150, 152 constantly, constant operation of the reels is obtained. The cooler canway construction which I have provided can be used with a constantly operating line and produces the efficacious result of eliminating skin in the milk, as previously described. However, this canway construction is also useful and almost indispensable in the cooler of a line operated on the newly-developed intermittent method.

In the intermittent method the reels operate intermittently in order to increase the viscosity of the milk during the sterilizing process. This method is disclosed in the co-pending application of Albert R. Thompson and Joseph Bucher, Serial No. 324,452, filed March 18, 1940, and of which this case is a continuation in part. As there disclosed, the motors 150, 152 are operated intermittently in timed relation by means of a timing mechanism shown diagrammatically at 153 (Fig. 1), which comprises a constantly running motor 154 which through a reducing gear 155 rotates the shaft 156 on which two cams 157, 158 are mounted. The two cams are substantially identical in contour, but are angularly displaced with respect to each other on the shaft 156. Cam followers 159, 160 through suitable linkage rock mercoid switches 163, 164, which control the operation of motors 150, 152. The cams 157, 158 being similar, serve to cause the motors 150, 152 to operate for a definite length of time and then by rocking the mercoid switches 163, 164, stop the motors for a definite length of time. When the followers 159, 160 are again lifted out of the dwells in the cams 157, 158, the mercoid switches 163, 164 are again closed.

The motor 154 is preferably a synchronous motor, and as a result, the reel motors are caused to start and stop at definite time intervals. The cams 157, 158 are angularly disposed with respect to each other, to give motor 152 a lag in time of operation with respect to the motor 150. The amount of this lag is determined by the length of the transfer chute 23, the purpose being to insure that all of the cans are taken out of the chute 23 after the preheater B is stopped before the sterilizer C is stopped. At the end of the rest period, the timing mechanism 153 starts the motor 150 to begin the operation of the reel in the preheater B, before the motor 152 is started. Again the angular displacement of the cams 157, 158 causes the sterilizer motor 152 to start the reel of the sterilizer after the preheater has started or as soon as the transfer chute 23 is filled.

The chute 20 which supplies the cans to the preheater from the filling machine is made long enough to store as many cans as the filling machine A, which operates constantly, will deliver during the time that the preheater is at rest. For example, if the preheater B has a rest period of one minute, and the filling machine A is operated at the rate of 200 cans per minute, then the accumulator 20 should be long enough to contain 200 cans. The speed of operation of the preheater, sterilizer and cooler is such that in their intermittent operation, they average the same number of cans per minute as the filling machine, so that, for example, if the preheater has an operating period of three minutes, it is operated at a sufficient speed to absorb the cans contained in the accumulator 20, and in addition, three minutes output of the filling machine A.

The motor 80, which drives the mechanism for reciprocating the agitating portion of the cooler canway, is constantly running in the sense previously explained, and as shown in the wiring diagram, is connected to the line through the main switch 140.

Having described the timing of the apparatus, the operation of the progression of the cans through the machine will now be briefly described.

The cans are filled with milk by the filling machine A, and are discharged into the chute 20. If the preheater B is operating, the elevator 21 immediately conveys the cans into the preheater. If the reel of the preheater is at rest, the cans accumulate in the chute 20. By the time the can has arrived at the discharge 22 of the preheater B, the milk has been raised to a temperature of approximately 210° and held at that temperature for a period of time so that it has been sufficiently stabilized to undergo the high heat of sterilization.

The cans are then deposited in the chute 23, from which they are carried into the sterilizer by the elevator 24. The valve 25 introduces the can into the pockets between the channels 42 (Fig. 6) which are I in section to maintain the can out of contact with the canway 45 at all times, including the traverse of the can over the bottom of the tank. This prevents the cans from having rolling engagement with the canway 45 and limits the agitation of the milk in the can to the very slight agitation which comes from the turning of the can with the reel. During the rest period of the sterilizer reel 43, the cans are absolutely at rest and the contents receive no agitation whatever, and then during the operating period of the sterilizer reel, the contents of the can receive the gentle agitation resulting from the can being carried around with the reel in its rotation.

When the cans leave the sterilizer through the transfer valve 27 they are introduced into the cooler D, where they immediately receive a jet of water from the nozzle 145, and from the nozzles 142, 143, which spray the water all over the interior surface of the upper portion of the shell. Also, the cans are deposited in the reciprocating canway 60, which immediately starts to agitate the cans, whether the reel 51 is rotating or not. Since the reel 51 of the cooler is geared to the reel 43 of the sterilizer, the cooler reel 51 comes to a stop whenever the timing mechanism 153 (Fig. 1) stops the motor 152. It is, therefore, essential that means be provided for agitating the can which is constant in operation and independent of the operation of the cooler reel, for if the milk is allowed to become quiescent in this temperature zone skin is very apt to form in it.

The length of the agitating canway 60 (Fig. 7) is designed to keep the can in constant agitation by reciprocating the can axially until the milk temperature has been lowered below the critical temperature at which skin forms, namely about 180° F. After the can has been transferred to the stationary portion 120, it is only agitated when the reel rotates. This agitation is sufficient in the latter part of the cooling process, because the milk is then at a safe low temperature.

One of the advantages of the means for agitating the cans in the cooler disclosed herein is that it can be used in milk-treating apparatus operated either continuously or intermittently. By providing the variable drive 81 the amount of agitation can be controlled to meet the day-by-day requirements in each plant, for even in a single plant the amount of skin may vary from day to day.

In addition, the agitating means of my invention is selectively operable. If the milk line is being operated by the continuous method and no trouble with skin is encountered, the motor 80 is not operated. However, skin is more often present than not. In fact, it is one of the major problems in processing milk. Analysis of reports from the principal evaporated milk plants situated in the great milk-producing areas of the United States, such as the upper Mississippi Valley, showed that every plant had trouble with skin formation.

Having thus described my invention and in what manner the same may be used, what I claim as new and desire to protect by Letters Patent is:

1. In an apparatus for processing canned goods, a chamber, a canway for guiding the cans through said chamber, means to move the cans along said canway, a portion of said canway being fixed with respect to said chamber, another portion of said canway being movable with respect to said chamber, and means to impart an agitating movement to said movable portion of said canway, whereby the cans are shaken as they traverse said portion of said canway.

2. In a apparatus for processing canned goods, a chamber, a canway for guiding the cans through said chamber, means to move the cans along said canway, a portion of said canway being fixed with respect to said chamber, another portion of said canway being movable with respect to said chamber, and means to reciprocate said movable portion of said canway.

3. In an apparatus for handling canned goods, a rotary reel having longitudinal can channels thereon, a helical canway associated with said reel for advancing the cans along said channels upon rotation of the reel, and means for reciprocating said canway relative to said reel and axially thereof to impart reciprocating movement to the cans as they traverse said canway.

4. An apparatus for processing canned goods by the continuous method including, a cooling chamber, can conveying means to conduct the cans through said cooling chamber in a continuous procession, said conveying means including a movable portion mounted for reciprocation and another portion arranged to be stationary when said movable portion is reciprocated, and means to reciprocate said movable portion whereby to shake the cans as they are carried along by said movable portion and without interrupting the continuous movement of cans through said chamber.

5. An apparatus for processing canned goods by the continuous method including a treating chamber having a rotary can propelling reel and a helical canway therein for guiding cans propelled therealong by said reel, the foreportion of said canway being reciprocable with respect to said reel and chamber, and the after portion of said canway being stationary with respect to said reel and chamber, means to drive said reel, and means to impart shaking movement to said reciprocable portion of said canway.

6. In an apparatus for treating canned evaporated milk, a chamber having means for conducting a procession of cans therethrough comprising a rotatable reel and a helical canway associated therewith, a portion of said canway being reciprocable relative to said reel to impart agitation to the cans as they traverse said portion of said canway, and the remainder of said canway being non-reciprocable with respect to said reel, and means to agitate said reciprocable portion of said canway, including adjustable means to control the rate of agitation of the movable portion of the canway independently of the rate of rotation of said reel.

7. In an apparatus for handling canned goods, a rotary reel provided with longitudinal can channels, a helical canway associated with said reel for advancing the cans along said channels upon rotation of said reel, said canway having a plurality of its convolutions formed as a rigid unit and reciprocably mounted with respect to said reel, and means for imparting relative reciprocation between said unit and reel.

8. In an apparatus for treating canned goods, a chamber, a reel mounted for rotation in said chamber having can channels thereon, means for driving said reel, a helical canway comprising a stationary and movable portion mounted in said chamber for guiding the cans along said channels, said movable canway having its convolutions formed as a rigid unit and slidably mounted in said chamber, means for reciprocating said unit with respect to said reel, and means for varying the rate of reciprocation of said unit relative to the rate of rotation of said reel.

9. In an apparatus for treating canned goods, a chamber having a rotatable reel with can channels thereon, a helical canway for guiding the cans along said channels, and an inlet opening in the chamber to introduce cans into said canway, said canway being mounted in said chamber for reciprocation with respect thereto, and the beginning of said canway adjacent said inlet comprising two rails spaced apart a distance at least the length of the can plus the stroke of the canway said two rails leading away from said inlet opening and converging into a single rail at a point spaced therefrom to form a continuation of said canway.

10. In an apparatus for treating canned goods, a chamber having a reel provided with can channels, a canway to guide the cans along said channels, and an inlet for introducing the cans into said canway, a portion of said canway being slidably mounted in said chamber for reciprocation with respect to said reel, said portion comprising a plurality of turns of a single rail wound in a helix and forming a canway of substantially constant lead, and a pair of rails connecting with said single rail, said pair of rails forming a canway of greater lead than that formed by said single rail for receiving the cans introduced through said inlet and conducting the cans rapidly away from said inlet into said constant lead portion of said canway the width of the canway formed by said pair of rails being greater at the beginning thereof than the width of the canway formed by said single rail.

11. In an apparatus for treating canned goods, a chamber having a reel provided with can channels and a canway to guide the cans along said channels, a portion of said canway being slidably mounted in said chamber for reciprocation with respect to said reel, another portion of said canway being fixedly mounted in said chamber, the beginning of said fixed portion of said canway having a single can-guiding rib, the end of said reciprocating portion of said canway having two can-guiding ribs spaced apart a distance equal to the stroke of said reciprocating portion, said two ribs being alternately aligned with said single rib in said fixed portion of said canway whereby transfer of the cans from said reciprocating portion to said fixed portion of said canway is facilitated.

12. In an apparatus for treating canned goods, a chamber having a reel provided with can channels and a canway to guide the cans along said channels, a portion of said canway being slidably mounted in said chamber for reciprocation with respect to said reel, another portion of said canway being fixedly mounted in said chamber and arranged to receive the cans as they leave the reciprocating portion of said canway, said fixed canway having at the beginning thereof track means for guiding one end of the can as it passes through the transfer zone from the end of the reciprocating portion into the beginning of the fixed portion of said canway.

13. In an apparatus for processing canned goods, a treatment chamber having an inlet and an outlet, means for conducting the cans in continuous procession through said chamber, said conducting means including a rotary can propelling reel and a helical guide engaging the ends of the cans to direct each can in the same path of travel from said inlet to said outlet, a portion of said guide being movable relative to said reel, and the remainder of said guide being stationary with respect thereto, and means with respect to said reel to move said movable portion of said guide back and forth to impart axial reciprocation to the cans in engagement therewith.

14. In an apparatus for handling canned goods, a rotary reel having longitudinal can channels thereon, a helical canway associated with said reel to advance containers along said channels upon rotation of said reel, a portion of said canway being fixed against movement axially of said reel and another portion of said canway benig movable axially thereof, and means to reciprocate said movable portion of the canway.

15. In an apparatus for handling canned goods, a rotary reel having longitudinal can receiving channels thereon, a helical canway associated with said reel for advancing cans along said channels upon rotation of said reel, and means for reciprocating said canway relative to said reel.

16. An apparatus for handling canned goods comprising a rotatable reel provided with longitudinally extending can receiving channels thereon, means for introducing cans into said channels, a helically trending can track associated with said reel for advancing the cans along said channels upon rotation of said reel, and means for reciprocating said can track axially with respect to said reel, said can track having a preliminary portion embodying a pair of guide rails arranged to receive therebetween the cans introduced into said channels and spaced apart at the point where the cans are received therebetween a distance at least equal to the length of a can plus the stroke of the can track, said pair of guide rails converging to merge into a single guide rail, and said single guide rail forming the succeeding portion of said can track.

17. An apparatus for handling canned goods comprising a rotatable reel provided with longitudinally extending can receiving channels thereon, means for introducing cans into said channels, a helically trending can track associated with said reel for advancing the cans along said channels upon rotation of said reel, and means for reciprocating said can track axially with respect to said reel, said can track having a preliminary portion embodying a pair of guide rails arranged to receive therebetween the cans introduced into said channels and spaced apart at the point where the cans are received therebetween a distance at least equal to the length of a can plus the stroke of the can track, said pair of guide rails being spaced apart a distance less than the length of a can plus the stroke of the can track at a point less than a full turn of said track from the point where the cans are received therebetween and merging into a single guide rail at a point still further removed from said first mentioned point, and said single guide rail forming the succeeding portion of said can track.

18. In an apparatus for treating canned goods, a canway along which containers are guided for treatment, means for moving the containers along said canway, said canway comprising a pair of rails each arranged in a helix to form a can track and arranged end to end with the beginning of the rail of one helix forming a continuation of the end of the rail of the other helix, one of said rails being reciprocable axially of its helix relative to the other whereby to shake the containers traversing the same, and each rail having opposite guide faces for engaging the ends of containers; the distance between the opposite guide faces of the respective rails where one rail forms a continuation with the other being such that the opposite faces of the reciprocable rail are spaced apart a distance greater than those of the other rail an amount at least substantially the stroke of the reciprocable rail, whereby transfer of the containers from one helix to the other is facilitated.

19. In an apparatus for handling canned goods, a rotary reel having longitudinal can channels thereon, a helical canway comprising a stationary and a movable portion associated with said reel for advancing the cans along said channels upon rotation of the reel, and means for reciprocating the movable portion of said canway relative to and axially of said reel to impart reciprocating movement to the cans traversing said movable portion.

ALBERT R. THOMPSON.

CERTIFICATE OF CORRECTION.

Patent No. 2,337,784.　　　　　　　　　　　　　　　　December 28, 1943.

ALBERT R. THOMPSON.

It is hereby certified that error appears in the printed specification of the above numbered patent requiring correction as follows: Page 3, first column, line 44, for "at 118" read --at 119--; page 5, second column, line 61-62, after "means" strike out "with respect to said reel" and insert the same in line 63, after "forth"; line 73, for "benig" read --being--; and that the said Letters Patent should be read with this correction therein that the same may conform to the record of the case in the Patent Office.

Signed and sealed this 9th day of May, A. D. 1944.

Leslie Frazer (Seal)　　　　　　　　　　　　　　　　Acting Commissioner of Patents.